(12) United States Patent
Ishii et al.

(10) Patent No.: US 7,557,825 B2
(45) Date of Patent: Jul. 7, 2009

(54) CAMERA SYSTEM, CAMERA, AND CAMERA CONTROL METHOD

(75) Inventors: Mie Ishii, Machida (JP); Masakazu Matsugu, Chiba (JP); Katsuhiko Mori, Kawasaki (JP); Yusuke Mitarai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 819 days.

(21) Appl. No.: 11/145,380

(22) Filed: Jun. 3, 2005

(65) Prior Publication Data

US 2005/0280711 A1    Dec. 22, 2005

(30) Foreign Application Priority Data

Jun. 3, 2004    (JP)    ............................. 2004-166137

(51) Int. Cl.
*H04N 7/18*    (2006.01)
*H04N 5/232*    (2006.01)

(52) U.S. Cl. .................................... 348/159; 348/211.3
(58) Field of Classification Search ................ 348/159, 348/169, 211.3
See application file for complete search history.

(56) References Cited

U.S. PATENT DOCUMENTS

| 6,359,647 | B1* | 3/2002 | Sengupta et al. | ............ 348/154 |
| 7,242,423 | B2* | 7/2007 | Lin | ............................. 348/169 |
| 2003/0202102 | A1* | 10/2003 | Shiota et al. | ................ 348/159 |
| 2004/0109199 | A1* | 6/2004 | Tsubaki | ..................... 358/1.15 |

FOREIGN PATENT DOCUMENTS

| JP | 09-114988 | 5/1997 |
| JP | 3078166 | 6/2000 |
| JP | 2002-008032 | 1/2002 |
| JP | 2002-024229 | 1/2005 |

* cited by examiner

*Primary Examiner*—David L Ometz
*Assistant Examiner*—Dillon Durnford-Geszvain
(74) *Attorney, Agent, or Firm*—Cowan, Liebowitz & Latman, P.C.

(57) ABSTRACT

Camera information corresponding to the position at which the target to be searched for in the captured image is detected is identified, another camera specified by the identified camera information receives a notification that the target has been detected (S209), and when a notification is received from another camera, the posture of the own camera is controlled so that the area associated with the camera information specifying another camera can be observed (S211).

7 Claims, 9 Drawing Sheets

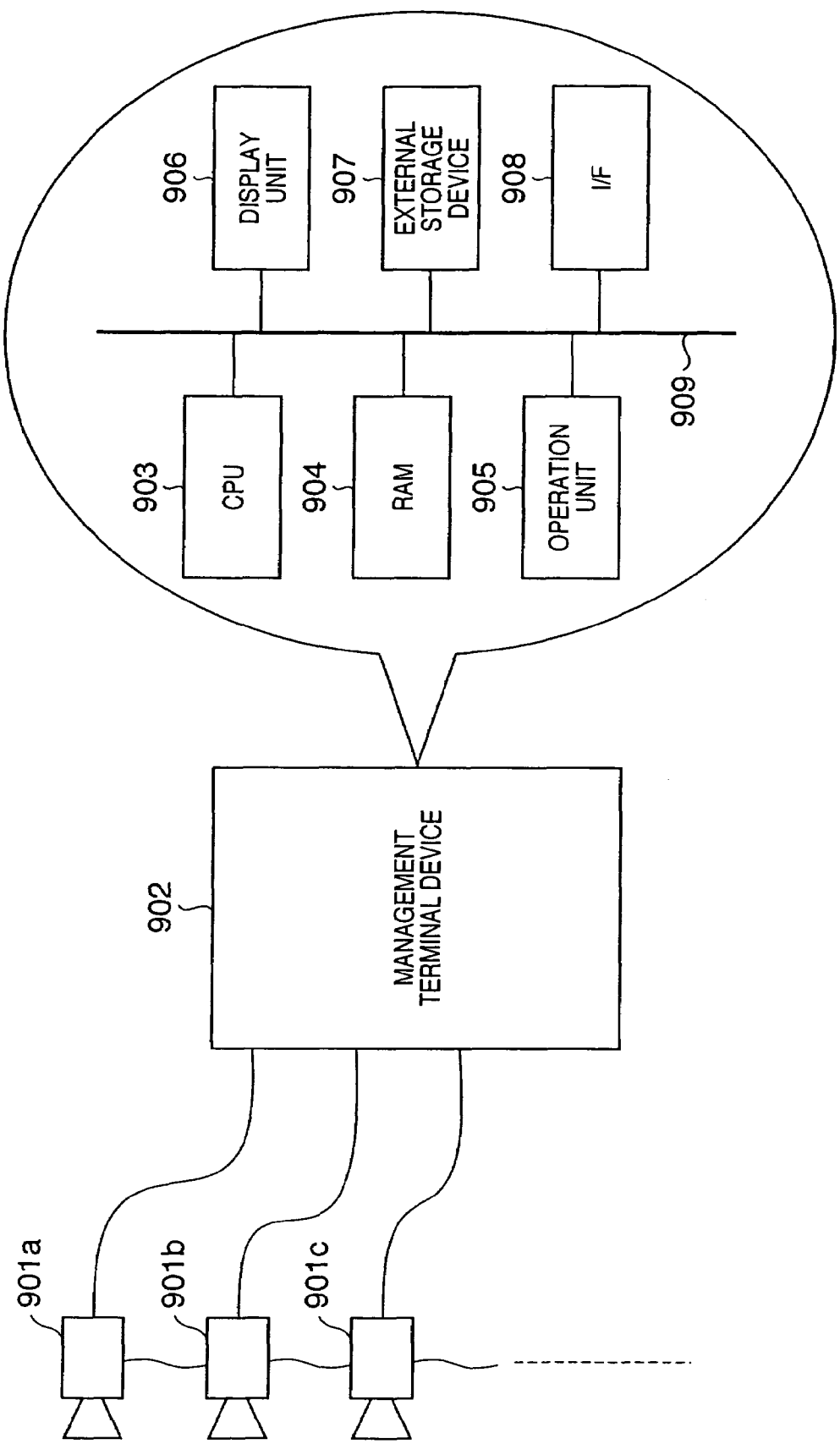

CAMERA SYSTEM, CAMERA, AND CAMERA CONTROL METHOD

FIELD OF THE INVENTION

The present invention relates to the technology of searching for a specific person such as a lost child, a criminal, etc., using a video obtained by a camera.

BACKGROUND OF THE INVENTION

Conventionally, a common method for searching a lost child in an amusement park, a department store, or elsewhere, is for a human operator to broadcast that a child has been lost once an inquiry has been made about a lost child. A system for reducing personnel expenses has been demanded.

When a lost child is to be searched for using an image-monitoring device, it is necessary to mount the image-monitoring device in the area to be monitored and have an operator constantly watch an image of the monitored area by capturing it on camera. If a monitored area is large, a number of image-monitoring devices used necessarily increases, and the operator must simultaneously check a plurality of images, and/or the number of operators must be increased. Furthermore, the operator must memorize the features of a person to be searched for.

In the search system for reducing the load on an operator, an area including an image of a person is detected from an image inputted by an image input unit configured by at least one camera mounted in an area to be searched. If it is determined that the image of the person is a candidate for a lost child being searched for based on the features of the lost child who is an input target person to be searched for, the similarity, and the probability of the presence of a lost child determined for camera placement, then the image of the person as a candidate for the lost child and the information about the search are presented to a primary searcher, recorded, and transmitted to a candidate information communication terminal device of a secondary searcher who is, for example, an employee of an amusement park, etc. (as disclosed in, for example, Japanese Patent Laid-open Publication No. 9-114988).

Furthermore, as a system of detecting a specific person, a camera mounted in the facilities of an amusement park, etc. captures an image, the image is transmitted to an image management server, and the image data of a person to be retrieved according to the personal information from the image data stored in the image management server is retrieved (as disclosed in, for example, Japanese Patent Laid-open Publication No. 2002-24229).

As described above, a system of searching for a person to be searched for in the images captured by the image pickup apparatus arranged in the monitor area is in the development stage. However, in any of the above-mentioned inventions, an image captured by the image pickup apparatus arranged in the monitored area is to be temporarily transmitted to a server and stored therein. Therefore, the server requires a storage device with a large capacity. Additionally, when a plurality of image pickup apparatuses are mounted, the capacity required to store the images and the processing load increases. After an image is transmitted to the server and the server performs a person detecting process, the information about the person is transmitted to a primary searcher and a secondary searcher, taking a long time, allowing the target person to move and be lost.

SUMMARY OF THE INVENTION

The present invention has been developed to solve the above-mentioned problems, and aims at providing the technology of reducing the load of a person and a server device, and quickly detect a target.

In order to achieve an object of the present invention, for example, a camera system of the present invention comprises the following arrangement.

That is, a camera system configured by a plurality of cameras whose posture can be controlled, and a control device for controlling the plurality of cameras, wherein:

the control device comprises:

first holding means for holding data relating to a target to be searched for; and first transmission means for transmitting the data relating to the target to each of the plurality of cameras, wherein each of the plurality of cameras comprises:

second holding means for holding camera information specifying another camera assumed to be able to capture an image having a shared area with a captured image obtained by its own camera as associated with information specifying the shared area;

search means for searching a captured image for the target to be searched for using the data obtained by the first transmission means;

notification means for identifying from the second holding means camera information corresponding to a position at which the search means has detected the target, and notifying another camera specified by the identified camera information that the search means has detected the target; and control means for controlling a posture of the own camera when the own camera has received the notification from the notification means of another camera so that an area associated with camera information specifying the other camera in the image captured by the own camera can be observed.

In order to achieve an object of the present invention, for example, a camera of the present invention comprises the following arrangement.

That is, a camera capable of controlling a posture and communicating with another camera, comprising:

holding means for holding camera information specifying another camera assumed to be able to capture an image having a shared area with a captured image obtained by its own camera as associated with information specifying the shared area;

search means for searching a captured image for a target to be searched for using data relating to the target to be searched for transmitted from an external device;

notification means for identifying from the holding means camera information corresponding to a position at which the search means has detected the target, and notifying another camera specified by the identified camera information that the search means has detected the target; and control means for controlling a posture of the own camera when the own camera has received the notification from the notification means of another camera so that an area associated with camera information specifying the other camera in the image captured by the own camera can be observed.

In order to achieve an object of the present invention, for example, a method for controlling a camera of the present invention comprises the following arrangement.

That is, a method for controlling a camera capable of controlling a posture and communicating with another camera, comprising:

a holding step of holding camera information specifying another camera assumed to be able to capture an image having a shared area with a captured image obtained by its own camera as associated with information specifying the shared area, in a memory;

a search step of searching a captured image for a target to be searched for using data relating to the target to be searched for transmitted from an external device;

a notification step of identifying from the memory camera information corresponding to a position at which the target has been detected in the search step, and notifying another camera specified by the identified camera information that the target has been detected in the search step; and a control step of controlling a posture of the own camera when the own camera has received the notification in the notification step of another camera so that an area associated with camera information specifying the other camera in the image captured by the own camera can be observed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 shows the basic configuration of the camera system according to the first embodiment of the present invention.

DETAILED DESCRIPTION OF THE PREFERRED EMBODIMENTS

Figure 1:
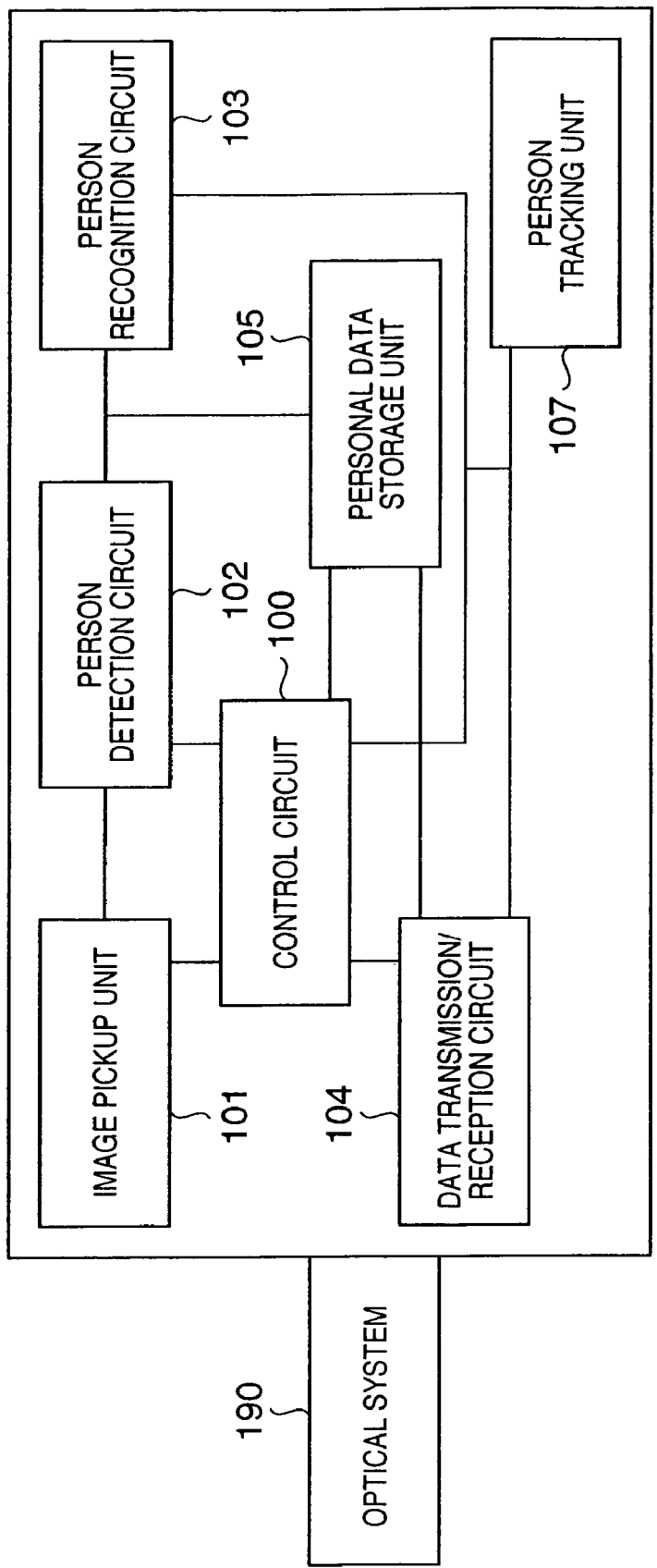
FIG. 1 shows the configuration of a camera (a monitor camera with a person search facility) configuring a camera system according to the first embodiment of the present invention.

Preferred embodiments of the present invention will now be described in detail in accordance with the accompanying drawings.

First Embodiment

FIG. 9 shows the basic configuration of the camera system according to the first embodiment of the present invention. The camera system according to the present embodiment is configured by a plurality of cameras (901a to 901c in FIG. 9) and a management terminal device 902. Each camera is connected to the management terminal device 902 so that data can be communicated between the camera and the management terminal devices 902. The cameras can communicate with the management terminal device 902 not only by cable, but also by wireless if possible.

Data communications can be performed also among the cameras. Although the connection line is shown only between the adjacent cameras in FIG. 9, the connection lines are actually laid so that data communications can be performed with other cameras. When data communications are performed by cable among the cameras, the communications are established through, for example, a TCP/IP-based protocol.

The communications among the cameras are not limited to cable communications, but can also be performed by wireless is possible. When data communications are performed by wireless among cameras, for example, the camera can be used with a CSMA (carrier search multiple access) system wireless modem (449 MHz) to select a free data channel in a contention system for communications. Data channel communications enables frequency division-multiplex system, and a plurality of monitor cameras can simultaneously establish communications.

The management terminal device 902 is, for example, a computer such as a PC (personal computer), etc., and is configured by a CPU 903, RAM 904, an operation unit 905, a display unit 906, an external storage device 907, an interface 908, and a bus 909.

The CPU 903 controls the entire management terminal device 902 using a program and data loaded into the RAM 904, and performs each process described later as a process to be performed by the management terminal device 902.

The RAM 904 has an area for temporarily storing a program and data loaded from the external storage device 907, and also has a work area required when various processes are performed by the CPU 903. It also has an area for temporarily storing data externally received through the I/F 908.

The operation unit 905 is configured by a keyboard, a mouse, etc., and an operator of the management terminal device 902 issues various instructions to the CPU 903, and inputs various data using them.

The display unit 906 is configured by a CRT, a liquid crystal screen, etc., and displays an image, a character, etc.

The external storage device 907 is a large capacity information storage device such as a hard disk drive device, etc., and stores a program and data for allowing the CPU 903 to perform each process described later as a process to be performed by the OS (operating system) and the management terminal device 902.

The I/F 908 functions as an interface for connecting the plurality of cameras to the management terminal device 902, and the management terminal device 902 communicates various data with a camera through the I/F 908.

The bus 909 connects each components described above.

According to the present embodiment, each camera is arranged in each position in facilities such as an amusement park, etc. to capture an image in an image pickup range assigned to each camera. The management terminal device 902 is mounted in a managing center (information center) in facilities, and is operated by an operator of the management center.

The above-mentioned camera is explained below.

FIG. 1 shows the configuration of a camera (monitor camera with a person search facility) configuring the camera system according to the present embodiment. The camera according to the present embodiment is configured by an image pickup unit 101, a person detection circuit 102, a person recognition circuit 103, a data transmission/reception circuit 104, a personal data storage unit 105, a person tracking unit 107, an optical system 190, a control circuit 100, etc.

The control circuit 100 controls an operation of each unit described later and configuring a camera.

The image pickup unit 101 is configured by a plurality of image pickup elements, and captures external video (moving picture) by converting external light to an electric signal. As an image pickup element, for example, a 360 thousand pixel ¼ type CCD, or an equivalent CMOS sensor is used, and the horizontal resolution of 470 lines and more and the vertical resolution of 350 lines are used.

The person detection circuit 102 searches the area in which a person is captured by the image pickup unit 101. The searching process is described later.

The person recognition circuit 103 recognizes whether or not the person searched for by the person detection circuit 102 is the target person.

The data transmission/reception circuit 104 performs a data transmission/reception process with external equipment, and corresponds to either an interface of an IEEE 1394 or various wireless communication ports.

The personal data storage unit 105 is memory for storing data described later relating to a target person to be searched for, and various data described later.

The person tracking unit 107 includes an actuator (actuator (oscillation mechanism) for control in the optical axis) for controlling the image pickup unit 101 in the image pickup direction (optical axis direction), and a circuit for a process for predicting the position of a target person in the video in the next frame in the video from the image pickup unit 101.

Figure 2:
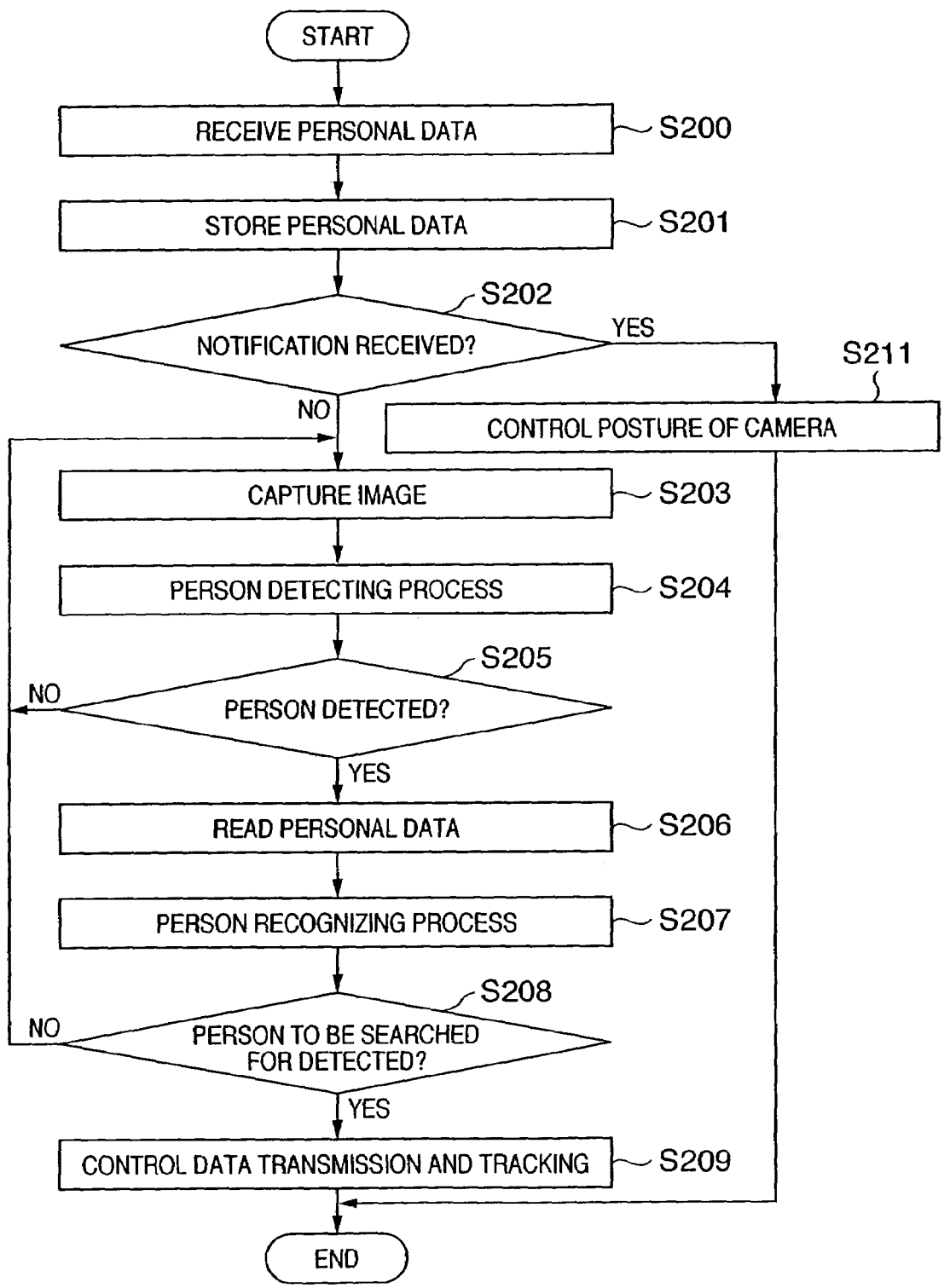
FIG. 2 is a flowchart of the process performed by a camera configuring a camera system according to the first embodiment of the present invention.

The process performed by the camera configuring the camera system according to the present embodiment is explained below in detail by referring to FIG. 2 showing the flowchart of the process. The program according to the flowchart shown in FIG. 2 is stored in the memory not shown in FIG. 2 and performed by the CPU not shown in the control circuit 100, and the camera according to the present embodiment can perform each process described later according to the flowchart shown in FIG. 2.

The flowchart shown in FIG. 2 is used in searching for a specific person in facilities.

When a management center (information center) receives an inquiry about a lost child, an operator obtains the features of the lost child from a primary searcher, and prepares them into data. The features of a lost child are, for example, the height (approximate value in cm), the body characteristic (slender, fat, etc.), the hairdo, the characteristics of eyes and nose, the clothes (color, shape), etc.

The preparation of the information into data concretely refers to inputting the information about the lost child as data to the management terminal device 902, and the following operations are performed.

The operator inputs the features of the lost child to the management terminal device 902 using the operation unit 905. The input data is temporarily stored in the RAM 904 as the data of the features of the lost child.

Since the external storage device 907 of the management terminal device 902 stores in advance the three-dimensional model data of various shapes and sizes of eyes, noses, mouths, ears, etc., and texture data indicating various hairdos, etc. as images, the operator can list them on the display screen of the display unit 906 using the operation unit 905, and selects the three-dimensional model and texture that seem to be close to the features obtained from the primary searcher using the operation unit 905. The colors and the shapes of the selected three-dimensional model and texture are changed using the operation unit 905 so that the features of the lost child can be approached, the models of the eyes, nose, mouth, etc. are arranged in the appropriate positions on the display screen of the display unit 906 using the operation unit 905, the three-dimensional model of the face of the lost child is generated, and the front view of the three-dimensional model is obtained as a "montage image" for the lost child. Preferable software for generating such a three-dimensional model is a well-known three-dimensional modeling tool, and the program of the tool is assumed to be installed in advance in the external storage device 907.

When the photo of the face of a lost child is obtained from the primary searcher, the generated three-dimensional model of the face of the lost child can be replaced with an image as a montage image obtained by reading the photo using a scanner not shown in the attached drawings.

There are various methods of obtaining a montage image, and the methods are not specifically limited.

When a montage image or an image obtained by scanning a photo (hereinafter also referred to as a montage image) is obtained, the operator operates the operation unit 905 to input to the CPU 903 an instruction to transmit to all cameras a montage image and the data of the features of the lost child. Therefore, the CPU 903 follows the instruction and transmits the data to the cameras through the I/F 908. The series of transmitted data is generally referred to as "data of a person to be searched for".

When each camera receives the data through the data transmission/reception circuit 104 (step S200), it stores the data in the personal data storage unit 105 (step S201). The camera constantly checks whether or not it has received a notification signal that the lost child has been detected in the view from the other cameras (step S202). If the notification signal has not been received, control is passed to step S203. The notification is described later.

When the notification signal is not received, the image pickup unit 101 of the camera captures the image in the space in front, and the video signal in each frame is sequentially input to the person detection circuit 102 (step S203). Then, the person detection circuit 102 detects an area in which a person is captured from the video in the input frames (step S204).

Although the method of detecting an area of the image of a person is not specifically limited, for example, in addition to the method described in the registered patent 03078166, the middle-order features such as the eyes, mouth, etc. are detected from among the low-order features such as the edge, etc. in the image, thus detecting a face in a multilayer neural network method (for example, Japanese Patent Laid-open Publication No. 2002-8032), etc. At this time, the color feature such as the skin color, etc. can be used.

When the person detection circuit 102 determines that there is no area including an image of a person in a video, control is returned to step S203, and the image pickup unit 101 sequentially outputs the video of each frame to the person detection circuit 102.

When the person detection circuit 102 determines that there is an area including an image of a person in a video, control is passed to step S205, and the person recognition circuit 103 reads the montage image stored in the personal data storage unit 105 in step S201, and it is determined using the montage image in step S204 whether or not the person detected in the area in step S204 is the lost child (person to be searched for) (step S207).

The process of this determination is performed in two steps. In the first step, not only the feature of the face, but also the rough features of the clothes, etc. are used in narrowing the choice of a person to be searched for. When there are a plurality of areas detected in step S204, it is performed by determining the targets having a predetermined value or higher as a value of similarity (or an index corresponding to the similarity) to the person of a montage image to be determined in the second step.

In the second step, the person to be searched for is detected using a further detailed feature from among the areas containing the persons considered to be the person of the montage image in the first step.

For example, relating to the color of the clothes, when the possible range of the pixel value (for example, if the value of a pixel configuring each image is represented by 8 bits, the possible range is 0-255) is equally divided into four categories for the color information such as the hue, the chroma, etc. of the pixel in the detection area and the pixel in the montage image, it is determined whether or not the color of the clothes belongs to the same category in each of the detection area and the montage image, the color of the clothes of the person in the detection area is determined to be the same as the color of the clothes of the person in the montage image if the determination indicates the same category, and the candidate is selected for the next process.

It is also possible to use the design (solid, striped, bordered, dotted, etc.) of clothes as the element in narrowing the candidates. When an inquiry about the features of texture is issued, a well-known method of comparing the similarity between feature vector data in a montage image about the feature vector obtained from the image by a Gabor Wavelet transform, etc. and feature vector data in the detection area can be used.

After roughly narrowing the candidates as described above, the hairdo (long, short, fixed, skinhead, etc.), the skin color (divided into about four types of colors of skin), the presence/absence of glassed, etc. are checked to narrow the candidates having the number of matching feature items larger than a predetermined value with a person to be searched for, and a detection area closest to the montage image is designated. When the detection area closest to the montage image is designated, it is determined in step S208 that the search has been successfully performed, and control is passed to step S209.

When the person in the detection area is a back view, the clothes, the hairdo, the silhouette, etc. are checked for similarity, and the sum of the similarity values is obtained to totally determine it in the threshold processing.

As explained above, when the area of the person to be searched for can be designated in the video obtained in step S203, control is passed to step S209, and the control circuit 100 performs each process described later (step S209).

The control circuit 100 first transmits the information (indicating to the operator the position where the camera is mounted using an ID of the camera, the position where the camera is mounted in the area of the control circuit 100, etc.) designating captured video and a camera to the management terminal device 902. Thus, the management terminal device 902 displays the captured video on the display screen of the display unit 906, thereby informing that the person to be searched for has been detected, and displays on the display screen the information designating the camera on the display screen, thereby informing which camera has transmitted the information and indicating to the operator watching the display screen where the person to be searched for can be located in the part.

The control circuit 100 further controls the person tracking unit 107 to change the posture of the camera such that the area of the person to be searched for in the video can be set in the center of the video (that is, the person to be searched for can be observed), and changes the posture of the camera until the area is located in the center of the video. The change in posture can be realized by the well-known automatic tracking facility.

The range of the posture of the movable camera is limited. That is, although the camera moves to change the posture such that the area of the person to be searched for can be located in the center of the video, it cannot move out of the range of the movable area. Therefore, if the posture of the camera is within the limit of the range of the movement of the camera, and the person to be searched for moves, then the person to be searched for will move outside the view of the camera (captured video).

Figure 4:
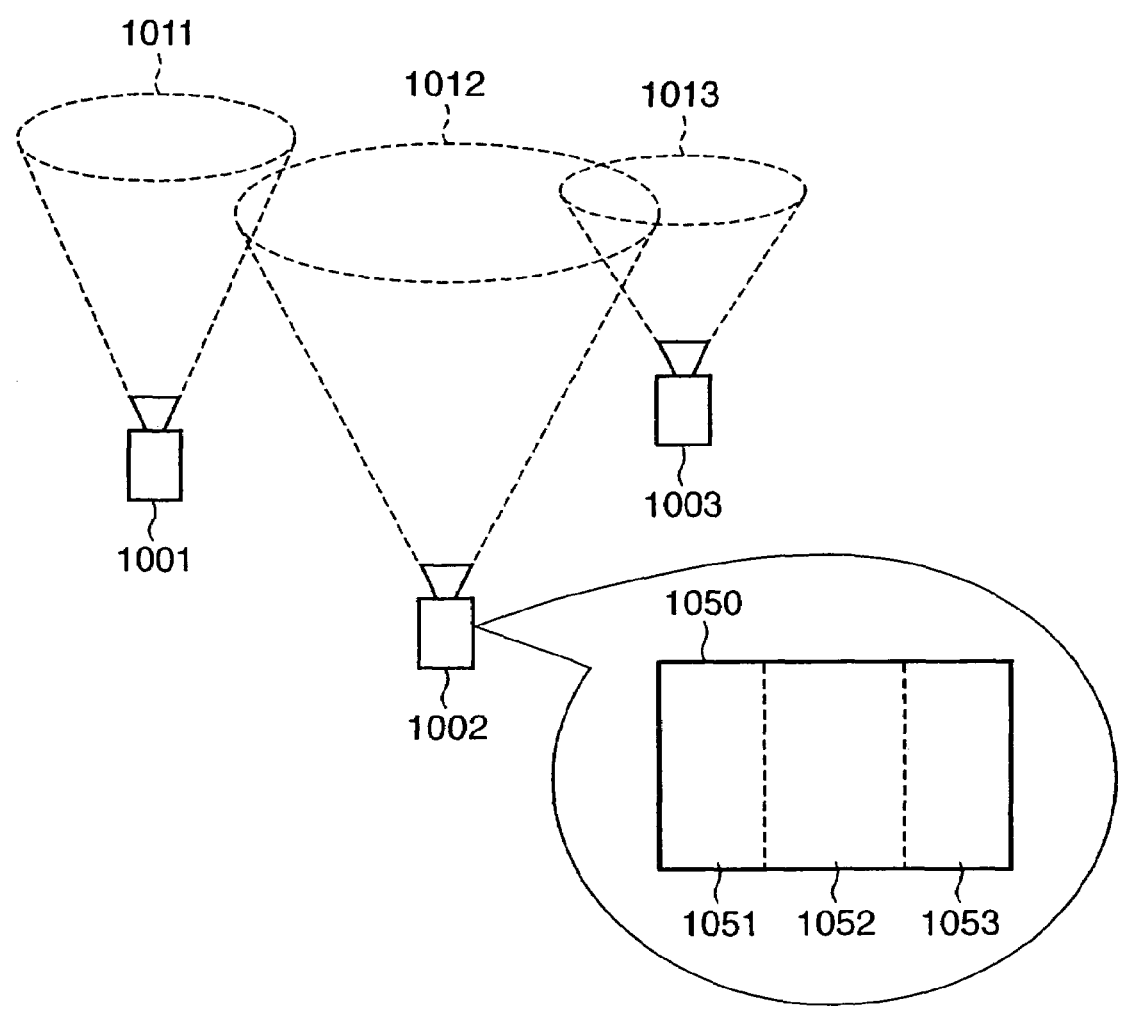
FIG. 4 shows an area in the view of one camera to be shared with some other cameras.

In the view of one camera, there is a view area to be shared with some other cameras. This is caused by the positions of mounting the cameras and the change in posture of each camera. FIG. 4 shows a view area of one camera to be shared with some other cameras. In FIG. 4, there are three cameras 1001, 1002, and 1003. The view of each camera is 1011, 1012, and 1013 as shown in FIG. 4, and a part of each view is shared with other views. In FIG. 4, video 1050 is obtained by the camera 1002, that is, the video in the view of the camera 1002. The video can be divided into three areas 1051, 1052, and 1053 as shown in FIG. 4.

The positional relationship between the cameras 1001 and 1002, and the posture of each camera allow the largest area to be occupied by the view of the camera 1001 in the video of the camera 1002. The largest area is the area 1051.

Similarly, the positional relationship between the cameras 1003 and 1002, and the posture of each camera allow the largest area to be occupied by the view of the camera 1003 in the video of the camera 1002. The largest area is the area 1053.

Thus, in the view of one camera, there is an area to be shared with some other cameras. Therefore, in the personal data storage unit 105 of each camera, area information in video is associated with the information (for example, a camera ID) designating a camera to share the view in the area and stored therein so that it can be clear which area is contained in the view of which camera.

Thus, for example, in the video 1050 of the camera 1002, when a person to be searched for is located in the area 1051, and if the posture of the camera 1001 is appropriately changed, it is determined that the person to be searched for can also enter the view of the camera 1001.

Therefore, in the present embodiment, if a person to be searched for is located in the view of the observed camera, then the camera uniquely determined by the camera information designated by the position of the person to be searched for in the video of the observed camera is notified of the detection of the person to be searched for. Thus, the notified camera can capture the person to be searched for in its own view by the above automatic tracking facility.

Accordingly, in step S202, when a notification signal indicating that a lost child has been detected in the view is received from another camera, control is passed to step S211, and the control circuit 100 controls the person tracking unit 107 to change the posture of the camera such that the area of the person to be searched for in the video can be located in the center of the video (that is, such that the person to be searched for can be observed), and the posture is changed until the area can be located in the center of the video (step S211). The change in posture can be realized by the well-known automatic tracking facility.

With the notification signal, the information designating the camera which has issued the notification signal can be transmitted. In this case, if there is no person to be searched for detected in the captured video of the camera which has received the notification signal, then the posture of the camera can be changed such that the area associated with the information designating the camera which has issued the notification signal can be observed.

Not only the notification is issued from a camera which has currently captured the person to be searched for in the video captured by its own camera to other cameras, but also the video containing the person to be searched for can be transmitted. In this case, since a camera which receives the video can use the video as a candidate for a montage image to be used in the recognizing process in step S207, the recognition ratio can be furthermore enhanced.

If a target person is cut off and lost by an obstacle during the tracking while controlling the optical axis direction, the person to be searched for is searched for in the vicinity of the obstacle, or the optical axis direction is held and the target person to be tracked (searched) for is searched for in the entire range of view.

As auxiliary means, the management terminal device 902 can determine the position in the monitor area of the camera to which the camera has moved based on the moving direction of the person to be searched for, and can transmit a search and track command including the determination information to the camera mounted in the vicinity of the position to which the camera has moved.

Then, the camera which has received a search and track command immediately controls the optical axis in the direction in which it is determined that a person to be searched for is located, and performs a searching process of searching the person based on the really shot image of the person included in the transmitted personal data.

So far as the person to be searched for is located in the boundary (common) observation area of a plurality of cameras, the camera which has received a search and track command and other cameras which have transmitted the same command can cooperate with each other in tracking and capturing the same person to be searched for. Cooperating with each other in the tracking process is to communicate personal data among the cameras during the pursuit, and when one camera is performing a tracking process, the camera can use the personal data of another camera.

Especially, when one camera cannot temporarily see a person to be searched for by another object or person cutting off the person to be searched for, the video of another camera can be effectively used if the image of the person to be searched for is separately supplemented in the video of the other camera. In this case, although the person to be searched for overlaps another person on the screen, there is almost no error of mistakenly detecting the person to be tracked because a person is recognized for each frame and used in tracking the person. Each camera can calculate a predicted position in the next frame based on the locus of a target to be tracked, and search for the person to be searched for in a local area based on the position set in the center. Thus, the time required for the searching process can be shortened.

As explained above, the operation of each camera is distributed and local process on the whole, and does not require a mechanism of centrally controlling the switching operation of a camera which tracks a target person based on the operation status of each camera and the current position of the person. Furthermore, the personal data can be switched only between the cameras whose observation views are adjacent to each other by controlling the optical axis direction of the cameras. Since the personal data includes the image data of a person to be searched for captured during the process, the probability of the detection by other monitor cameras can be enhanced. The operation of each camera is event-driven, and depends only on the data of a person to be searched for provided by an adjacent monitor camera and the operation status of the adjacent camera, and it is not necessary to map the observation views of all cameras being operated and monitor the view of each camera.

When each camera simultaneously searches for a target object to be tracked and performs an identifying process and when the object is cut off by an obstacle and cannot be observed, the object is searched for in a predetermined range with the tracking position immediately before the cutoff set in the center. Therefore, it is not necessary to store in advance the data of an observation area and an invisible area. Thus, a searching process in which a person to be searched for can be searched for stably without being lost and without a heavy load on the entire system can be performed.

Therefore, according to the present embodiment, a camera is allowed to have a person search facility, and does not require an image monitor server. Therefore, it is not necessary for a server to prepare a storage device of a large capacity for storage of moving pictures from multiple view points, thereby reducing the transmission and reception of wasteful data not including a person to be searched for. Furthermore, a person to be searched for can be detected by the cooperation (distributed and cooperative process) among a plurality of cameras, and a person to be searched for can be efficiently and quickly detected in the autonomous image recognizing process of each monitor camera.

Since the process from capturing to recognizing a person can be quickly performed using a camera, a person to be searched for can be quickly detected. Furthermore, the load of an operator continuously watching a camera can be removed, and a monitor camera does not record an image, but records action information. Therefore, an image-captured person is free of a violation of privacy.

By allowing a monitor camera to have the person search facility, a detected person is not lost.

Second Embodiment

In the first embodiment, when a camera detects a person to be searched for in the video captured by the camera, a notification signal indicating that the person has been detected, and the video is transmitted to other cameras and the management terminal device 902. However, in the present embodiment, in addition to the process of the above-mentioned first embodiment, the captured image of the person to be searched for is transmitted also to the portable terminal device (mobile telephone, PDA, etc.) carried by the staffs of a park, and the mounting position information about the camera which has captured the image is also transmitted.

Figure 3:
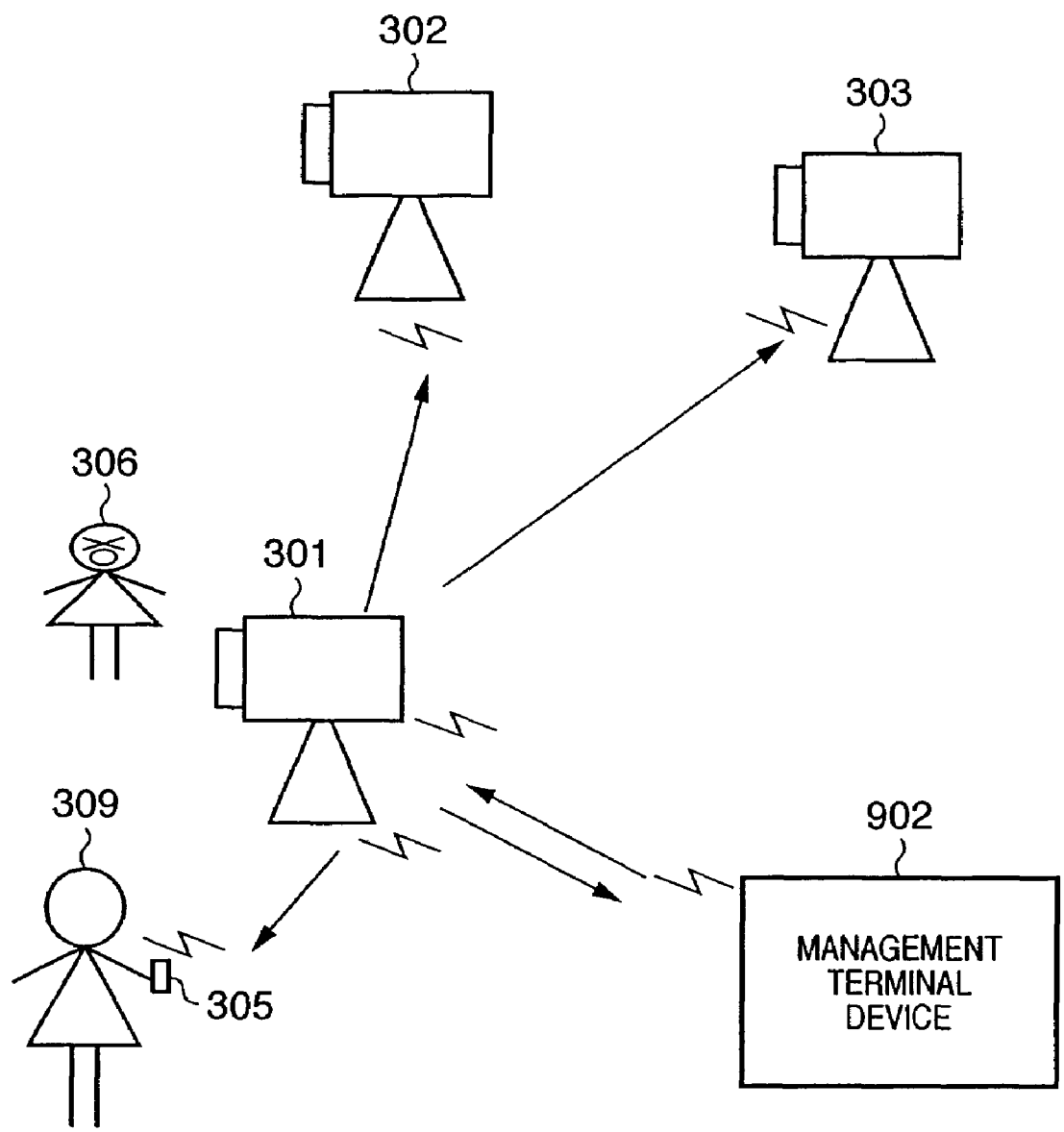
FIG. 3 is a schematic chart showing the status in which the camera system according to the second embodiment of the present invention is used.

FIG. 3 is a schematic chart showing the status in which the camera system according to the present embodiment is used. In FIG. 3, cameras 301 to 303 have the same function as the cameras according to the first embodiment. A person 306 to be searched for is a lost child. A staff 309 works for a park, and carries a portable terminal device 305. In FIG. 3, there is only one staff, but it is assumed that there actually are a plurality of staffs in a park. The portable terminal device 305 of the staff 309 can communicate data with an external unit by wireless, and has a display unit for checking the externally received information using an image and a character.

Therefore, when a camera detects a person to be searched for in the video captured by the camera, it transmits to the portable terminal device (mobile telephone, PDA, etc.) carried by a staff of the park a notification signal indicating that the person has been detected, a captured image including the person to be searched for, and the mounting position information about the camera which has captured the image.

Thus, each staff can confirm the video on the display screen of the portable terminal device, and confirm on the same display screen the mounting position information about the camera from which the information has been received, thereby obtaining the position of the camera which has captured the person to be searched for. As a result, the staff can roughly grasp the position of the person to be searched for. In addition to the mounting position information about the camera, not to be limited particularly, any information can be used so far as the information designates a camera and allows a staff to know where in the park the camera which has captured the video is mounted.

When a camera detects in the video obtained by the camera a person to be searched for, a notification signal indicating that the person has been detected, it is not necessary to transmit a captured image of the person to be searched for, and the mounting position information about the camera which has captured the person to all portable terminal devices. That is, when a portable terminal device has a GPS facility and the portable terminal device periodically notifies each camera of its own position obtained by the GPS facility, a camera receives the notification, grasps the position of each portable terminal device, designates a portable terminal device within a predetermined distance from its own position, and can transmit only to the designated portable terminal device the notification signal indicating that the person to be searched for has been detected, a captured image of the person to be searched for, and the mounting position information about the camera which has captured the image.

In the above-mentioned system, a staff can detect and conserve a lost child.

Third Embodiment

The present embodiment is different from the second embodiment in that in the cameras configuring the camera system according to the second embodiment, one or more cameras are mobile cameras.

Figure 5:
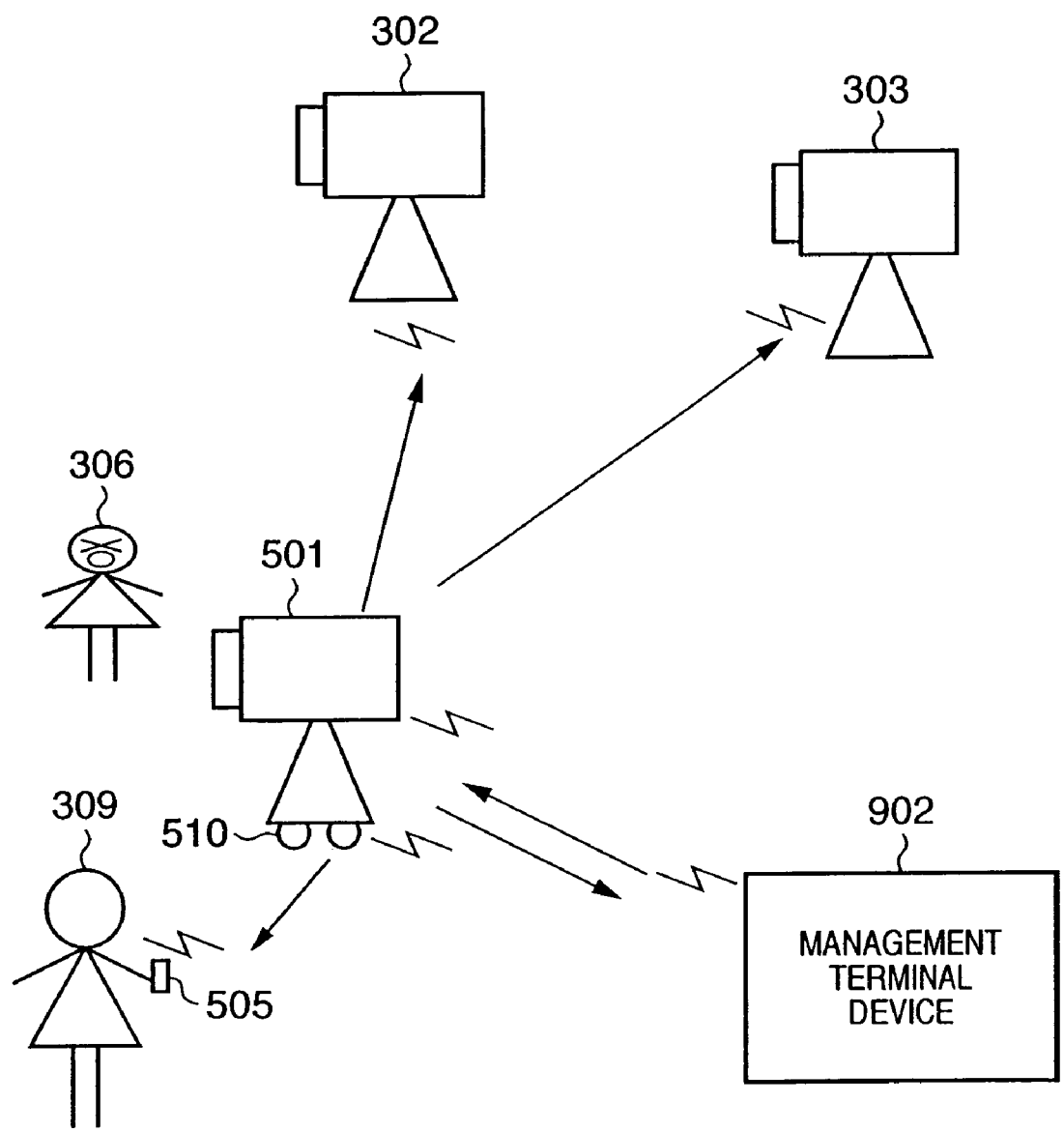
FIG. 5 is a schematic chart showing the status in which the camera system according to the third embodiment of the present invention is used.

FIG. 5 is a schematic chart showing the state in which the camera system according to the present embodiment is used. In FIG. 5, the component also shown in FIG. 3 is assigned the same reference numeral, and the explanation is omitted here. In FIG. 5, a camera 501 can change it own position. That is, it is a mobile camera, and has the same functions of camera as the camera according to the above-mentioned embodiment.

Figure 8:
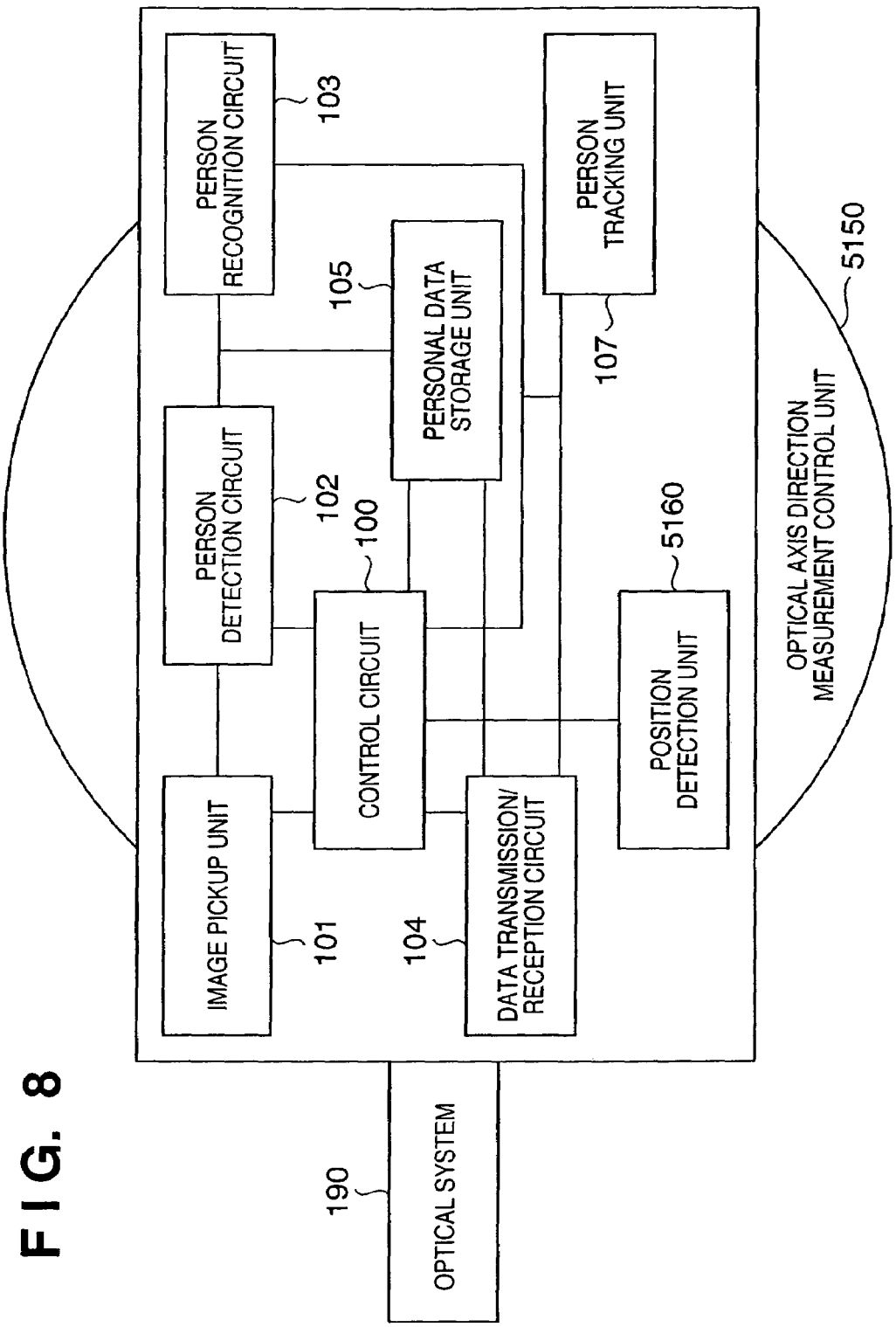
FIG. 8 shows the basic configuration of a camera 501.

FIG. 8 shows the basic configuration of the camera 501. In FIG. 8, the component also shown in FIG. 1 is assigned the same reference numeral, and the explanation is omitted here.

An optical axis direction measurement control unit 5150 mainly comprises what is called a pan head, its rotation angle measurement unit, a drive mechanism of a rotation stage, etc. The optical axis direction can be controlled both horizontally and vertically. The range of the swivel angle is 0-360° for a panning operation, and 0-180° for a tilting operation.

A position detection unit 5160 is to measure the position of the camera 501 itself using the GPS according to the present embodiment. The position of the camera measured using the GPS is periodically transmitted to the management terminal device 902 and the portable terminal device.

The camera 501 according to the present embodiment moves while tracking a person to be searched for when it detects the person to be searched for in the video captured by the camera. During the movement, the position information about the camera itself is transmitted to the management terminal device 902 and the portable terminal device.

In a system in which one or more monitor cameras having an autonomous mobile unit are arranged as in the present embodiment, it is inefficient and causes a large process load to grasp (calculate) the observation area of the boundary at any time between a mobile monitor camera and another camera with the possible cutoff by an obstacle taken into account. Therefore, the process of calculating the above-mentioned boundary observation area is not performed, but the boundary observation area is roughly set by the management center terminal or the autonomous mobile monitor camera (hereinafter referred to as a camera A) only according to the position information about the monitor camera.

Practically, the position detection unit 5160 periodically detects the current position of the mobile monitor camera, and the optical axis direction measurement control unit 5150 detects its optical axis (monitor) direction. Next, the orthogonal coordinates system with the camera 501 at the center detects the coordinates of the adjacent monitor camera at the fixed position. It can be obtained by easy conversion by calculating the coordinates of each of the predetermined fixed monitor cameras in the global fixed coordinates system including the entire monitor camera and the coordinates of the mobile monitor camera.

The range of the boundary area is defined as an overlapping area between the range of view centered on the current optical axis direction of the mobile monitor camera and the range of view centered on the current optical axis direction of the adjacent monitor camera in the areas in which the range of view (predetermined fixed value or a value obtained by measurement if variable) of the mobile (and 360° controllable in the optical axis direction) monitor camera overlaps the range of view of the adjacent fixed monitor camera. It is assumed that the current optical axis direction of the adjacent monitor camera can be obtained by periodical and mutual transmission/reception between the monitor cameras as capture condition data.

By performing the above-mentioned process, the correct position information about a person 506 to be searched for can be continuously grasped by the system without losing the detected person.

Fourth Embodiment

According to the present embodiment, when the management terminal device 902 transmits to a camera the data of a plurality of persons to be searched for, the camera performs a process of assigning a priority to the data of each person to be searched for. Other processes are the same as those according to the first embodiment.

Figure 7:
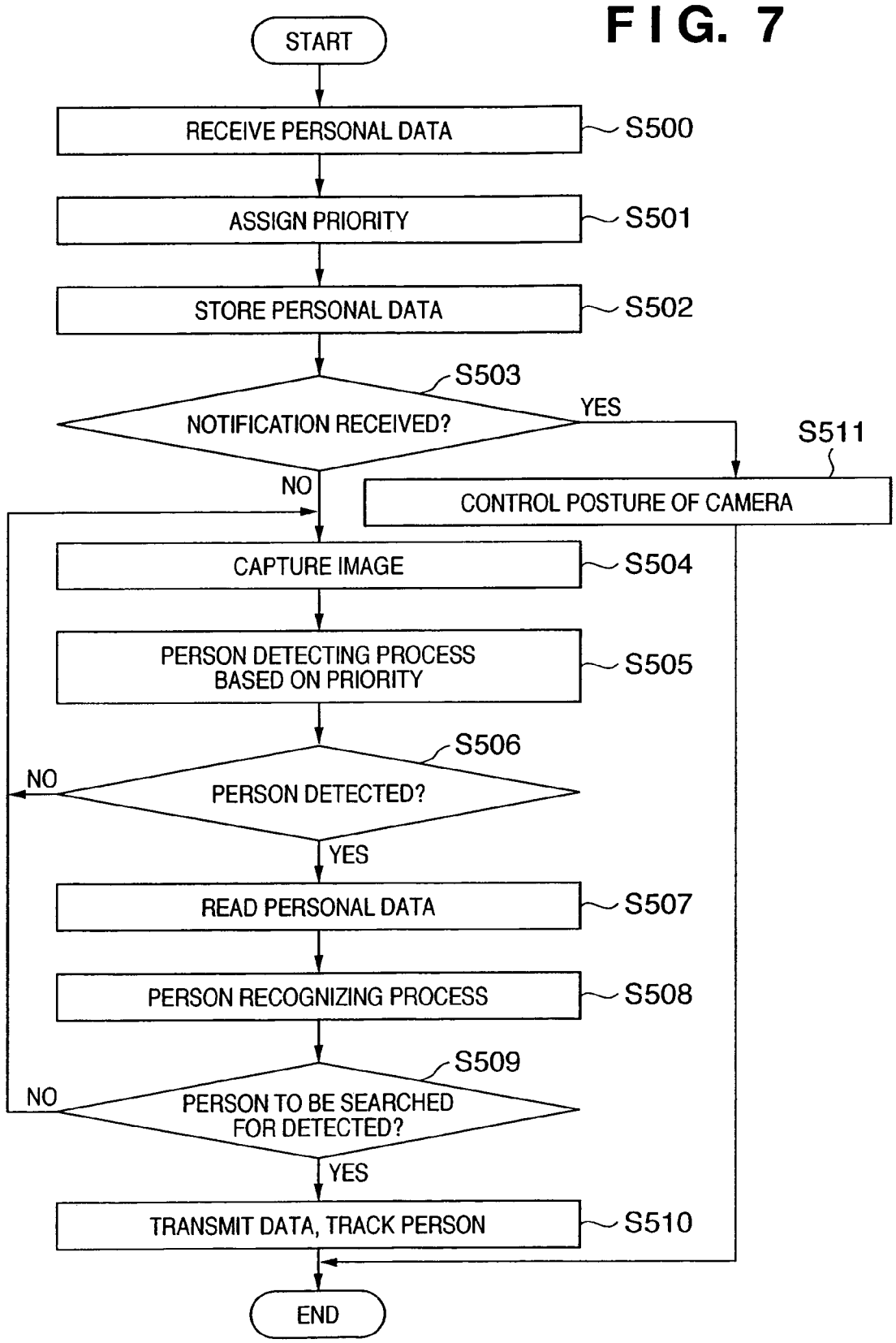
FIG. 7 is a flowchart of the process performed by a camera according to the fourth embodiment of the present invention.

FIG. 7 is a flowchart of the process performed by a camera according to the present embodiment. Since steps S500, S502-S504, and S506-S511 are the same as steps S200, S201-S203, and S205-S211, the processes in steps S501 and S505 which are different from the processes according to the first embodiment are explained below.

The control circuit 100 of the camera according to the present embodiment contains a timer, and has the function of keeping time.

The camera according to the present embodiment receives data of a person to be searched for from the management terminal device 902. To the data of a person to be searched for, the data indicating the time of an inquiry (time at which a request for a search is issued) about the person to be searched for in addition to the contents explained by referring to the first embodiment is added by the management terminal device 902. The data is inputted by the operator of the management terminal device 902 using the operation unit 905.

The control circuit 100 constantly refers to the current time, and assigns a higher priority to the data of older time, that is, the highest priority to the data of the oldest time (step S501). Then, the detection process in step S204 is performed on the data in order of a higher priority (step S505). If no person to be searched for can be detected, then the detecting process in step S505 is performed on the person to be searched for and assigned the next higher priority.

The method of assigning a priority is, for example, used by automatically switching ranks to A (highest rank) when the elapsed time from the inquiry time is 1 hour or less, B when it is between 1 hour and 3 hours, C when it is between 3 hours and 6 hours, and D (lowest rank) when it is 6 hours or more. However, when an inquiry is issued again, the inquiry time is newly inputted by the management terminal device 902, and the data of a person to be searched for and the re-inquiry time data are transmitted to the camera. At this time, the rank of a person to be searched for in each monitor camera is updated as described above.

For example, when a person to be searched for is detected regardless of the priority in each camera, the control circuit 100 assigns the priority of the highest rank to the person, and assigns the rank in the camera not detecting a person to be searched for only based on the elapsed time from the inquiry time. In the adjacent camera, when personal data is received from the monitor camera (or the management center terminal) which has detected a person to be searched for, the rank can be updated such that the person is assigned the priority of the highest rank.

A person to be searched for can be not only a lost child, but also a wanted criminal, etc. who is to be reported to the police office. In this case, as shown in FIG. 6, the camera can report the information to the terminal device 605 of the police office.

Figure 6:
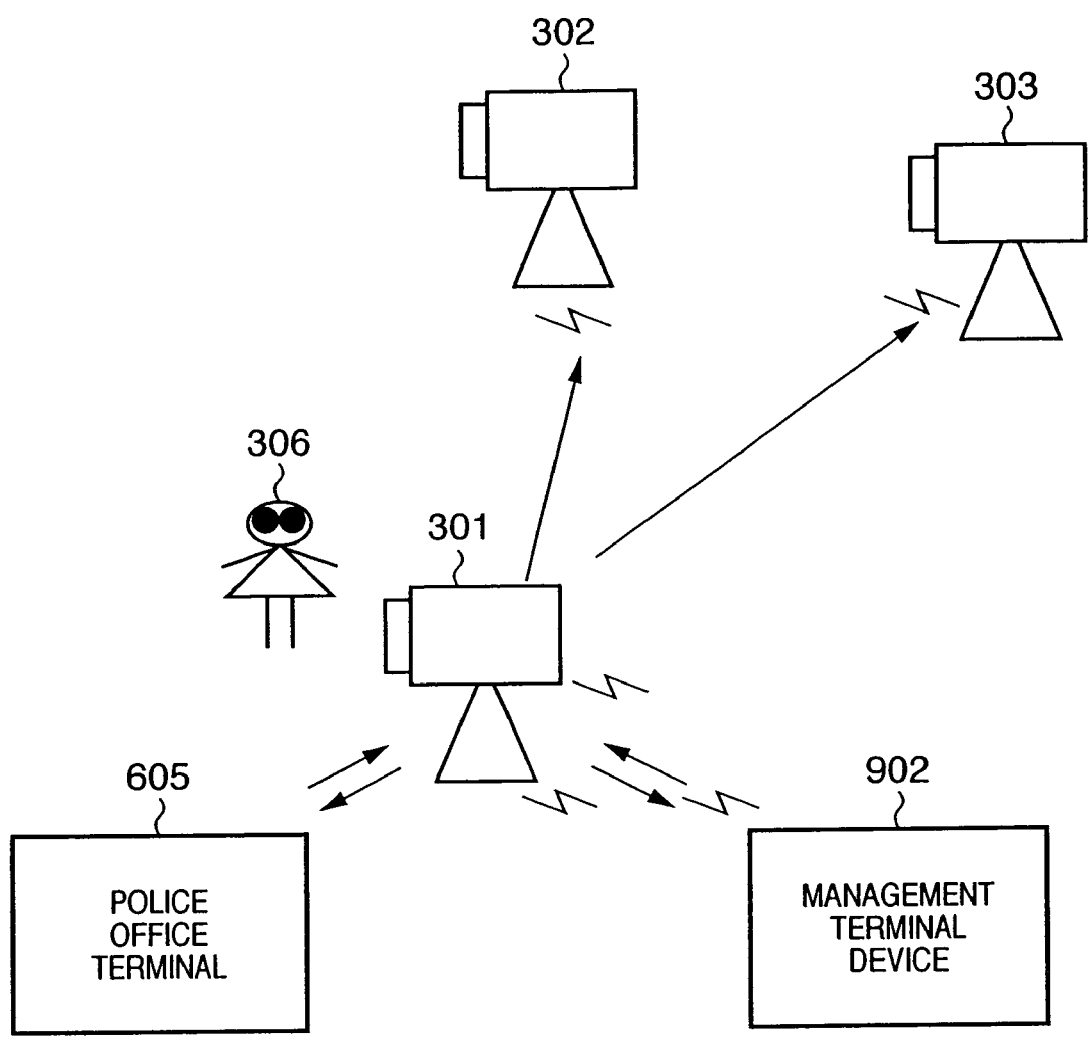
FIG. 6 shows an example of the configuration of the system notified by a camera to a terminal device 605 of a police office.

FIG. 6 shows an example of the configuration of the system in which a camera reports information to the terminal device 605 of the police office.

In this case, the contents of the report are the notification that a person to be searched for has been detected, the video including a shot image of the person to be searched for, the information designating the camera which has captured the video, etc. and immediately designating the position of a wanted criminal.

Other Embodiments

It is obvious that the objective of the present invention can also be attained by the CPU and MPU of a camera reading and executing a program code of a software realizing the function at the above-mentioned embodiment stored in a record medium (or storage medium). In this case, the program code read from the record medium realizes the function at the above-mentioned embodiment, and the record medium recording the program code configures the present invention.

Furthermore, it is obvious that, by the camera reading and executing the program code, not only the function according to the above-mentioned embodiment is realized, but also the operating system (OS), etc. operated on the camera performs all or a part of the actual process according to the instruction of the program code, and the function of the above-mentioned embodiment is realized by the process.

Additionally, it is obvious that, after the program code read from the record medium is written to the memory in the function expansion card inserted to a camera and the function expansion unit connected to the camera, the CPU, etc. in the function expansion card and the function expansion unit performs all or a part of the actual process based on the instruction of the program code, and the function according to the above-mentioned embodiment is realized by the process.

When the present invention is applied to the above-mentioned record medium, the record medium stores the program code corresponding to the flowchart (function configuration) explained above.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-166137 filed on Jun. 3, 2004, the entire contents of which are hereby incorporated by reference herein.

What is claimed is:

1. A camera system configured by a plurality of cameras whose posture can be controlled, and a control device for controlling the plurality of cameras, wherein:

the control device comprises:
   first holding means for holding data relating to a target to be searched for; and
   first transmission means for transmitting the data relating to the target to each of the plurality of cameras, wherein each of the plurality of cameras comprises:
   second holding means for holding camera information specifying another camera which can capture an image having a shared area with a captured image obtained by its own camera in association with the shared area;
   search means for searching a captured image for the target to be searched for using the data obtained by said first transmission means;
   identification means for identifying, if said search means has detected the target, another camera which can capture the target by referring from said second holding means the camera information corresponding to a position at which said search means has detected the target;
   notification means for sending notification to the identified camera that said search means has detected the target; and
   control means for controlling a posture of the own camera when the own camera has received the notification from another camera so that an area shared with the camera which has send the notification can be observed.

2. The camera system according to claim 1, wherein
each of the plurality of cameras further comprising
second transmission means for transmitting to another camera a captured image referred to in searching for the target when said search means has detected the target, wherein
said search means searches for the target in a captured image captured by an own camera using the captured image transmitted from said second transmission means of the other camera in addition to the data obtained by said first transmission means.

3. The camera system according to claim 1, wherein each of the plurality of cameras further comprising second transmission means for transmitting to another camera a captured image referred to in searching for the target, and information specifying a camera which has captured the referred image when said search means has detected the target.

4. The camera system according to claim 1, wherein:

each of the plurality of cameras further comprises:

third holding means for holding data relating to the target obtained from said first transmission means; and priority assignment means for assigning, when said third holding means holds a plurality of data relating to the target, a priority to each of the plurality of data depending on elapsed time from a point when each of the data is obtained from said first transmission means, wherein said search means performs the searching process based on the priority assigned by said priority assignment means.

5. A camera capable of controlling a posture and communicating with another camera, comprising:

holding means for holding camera information specifying another camera which can capture an image having a shared area with a captured image obtained by its own camera in association with the shared area;

search means for searching a captured image for a target to be searched for using data relating to the target to be searched for transmitted from an external device;

identification means for identifying, if said search means has detected the target, another camera which can capture the target by referring from said holding means the camera information corresponding to a position at which said search means has detected the target;

notification means for sending notification to the identified camera that said search means has detected the target; and control means for controlling a posture of the own camera when the own camera has received the notification from another camera so that an area shared with the camera which has send the notification can be observed.

6. A method for controlling a camera capable of controlling a posture and communicating with another camera, comprising:

a holding step of holding camera information specifying another camera which can capture an image having a shared area with a captured image obtained by its own camera in association with the shared area, in a memory;

a search step of searching a captured image for a target to be searched for using data relating to the target to be searched for transmitted from an external device;

an identification step of identifying, if said search step has detected a target, another camera can which can capture the target by referring from the memory the camera information corresponding to a position at which the target has been detected in the search step;

a notification step of sending notification to the identified camera that the target has been detected in the search step; and a control step of controlling a posture of the own camera when the own camera has received the notification from another camera so that an area shared with the camera which has send the notification can be observed.

7. A computer-readable storage medium characterized by storing a program for causing a camera to execute a control method of claim 6.

* * * * *